United States Patent [19]

Ohmae et al.

[11] 4,349,654
[45] Sep. 14, 1982

[54] POWDER COATING COMPOSITION

[75] Inventors: Tadayuki Ohmae; Teruhiko Murakami; Yoshinori Kanno, all of Niihama, Japan

[73] Assignee: Sumitomo Chemical Company, Limited, Osaka, Japan

[21] Appl. No.: 183,640

[22] Filed: Sep. 3, 1980

[30] Foreign Application Priority Data

Mar. 6, 1979 [JP] Japan .................................. 54-26263

[51] Int. Cl.$^3$ ...................... C08F 24/00; C08F 124/00; C08L 37/00
[52] U.S. Cl. ...................................... 526/273; 525/208
[58] Field of Search ......................... 526/273; 525/208

[56] References Cited

U.S. PATENT DOCUMENTS

| 3,383,372 | 5/1968 | Spivey | 526/273 |
| 3,388,190 | 6/1968 | Bryant | 525/208 |
| 3,440,200 | 4/1969 | Lindemann | 526/273 |
| 3,915,929 | 10/1975 | Kishikawa | 525/208 |
| 4,011,381 | 3/1977 | Iwasawa | 525/273 |
| 4,166,079 | 8/1979 | Tatsukami | 525/208 |

FOREIGN PATENT DOCUMENTS

| 4316393 | 7/1958 | Japan | 525/208 |
| 48-26388 | 8/1973 | Japan . | |
| 48-103645 | 12/1973 | Japan . | |
| 49-23842 | 3/1974 | Japan | 525/208 |
| 50-115239 | 9/1975 | Japan . | |

Primary Examiner—Paul Lieberman
Attorney, Agent, or Firm—Birch, Stewart, Kolasch and Birch

[57] ABSTRACT

Powder coating composition comprising a hydration reaction product of an ethylene-glycidyl acrylate compound copolymer and optionally powdery polyethylene which can give a coating layer having excellent properties, such as excellent bond strength to metals, water resistance and resistance to saline solutions.

5 Claims, No Drawings

POWDER COATING COMPOSITION

The present invention relates to a polyethylene powder coating composition which can give a coating layer having excellent bond strength to metals and excellent water resistance and resistance to saline solutions. More particularly, it relates to a powder coating composition comprising a hydration reaction product of ethylene-glycidyl acrylate compound copolymer and optionally powdery polyethylene and a filler or additive.

Known powder coating methods include fluidization dip coating, electrodeposition coating, or spray coating. These coating methods have various advantages which can not be achieved by liquid coating composition, for instance, they can be carried out without toxic or dangerous solvents, with high coating efficiency, and it is possible to coat in a thick layer by one coating. Because of these advantages, many researchers have actively studied on such a powder coating composition, particularly on powdery resins suitable for powder coating. Both thermoplastic and thermosetting resins can be used as the powdery resins for powder coating. Among them, polyethylene has widely been used for lining of steel pipes and drums, coating of electric wires and machines, and protecting coating of glasses, because of its low cost, availability in large quantity, and excellent properties such as water resistance, chemical resistance and electrical insulation properties. Particularly, polyethylene is very useful in coating of metal surface, and various processing methods have been developed. However, polyethylene is non-polar and hence is extremely inferior in adhesion to metals. This inferior adhesion is the most important problem in the coating composition of polyethylene. Accordingly, it has been proposed to improve the drawback of the polyethylene coating composition by various methods, but they are not necessarily satisfactory from the practical viewpoint. One of the proposed improvements, as disclosed in Japanese Patent Publication (unexamined) No. 79139/1976, is that the polyethylene powder is coated onto a metal surface heated at a temperature far higher than the melting point of polyethylene (e.g. 280° to 350° C.), by which a part of polyethylene is decomposed to form a polar group and thereby the adhesion to metal is improved. The polyethylene coating obtained by this method shows different adhesion due to different coating finishing methods or different surface states of the metals to be coated and is not necessarily satisfactory from the practical viewpoint. Alternatively, it is also proposed to incorporate previously adhesion-improving materials such as rubber or adhesion resins to polyethylene, but this method is not practically useful because of less stability in the processing at a high temperature. It has also been proposed in Japanese Patent Publication (unexamined) No. 103645/1973 that polyethylene be grafted with a polar group-containing monomer such as glycidyl methacrylate or be copolymerized with such a polar group-containing monomer in order to improve the adhesion of polyethylene. According to this method, the polyethylene can strongly adhere to metals, but when the coated product is contacted with an aqueous solution containing electrolytes such as sea water or saline solution, the product decreases its adhesion or rusts within a short period of the time resulting in peeling at the interface of the coated substances or in significant decrease of impact resistance. Accordingly, such a method cannot be applied to the inner coating of sea-water pipes. Owing to these drawbacks, the polyethylene powder coating is usually carried out by precoating a primer comprising specific adhesion resin onto the metal surface and then melt-coating thereon the powdery polyethylene, as is disclosed in Japanese Patent Publication (unexamined) No. 115239/1975. This method, however, still has drawbacks in that, while the salt resistance of the polyethylene at the adhesion face to metals can be improved, it requires extra steps of coating and curing of primer, and furthermore, the conventional primer, such as an epoxy resin, decreases the initial bond strength even in case of using modified polyethylene.

As a result of the present inventors' intensive study on an improvement of the conventional polyethylene powder coating composition, it has been found that the desired powder coating composition having excellent bond strength to metals, water resistance and resistance to saline solutions can be obtained by using a hydration reaction product of ethylene-glycidyl acrylate compound copolymer.

An object of the present invention is to provide an improved polyethylene powder coating composition which can give an excellent coating layer having improved properties in adhesion to metals and resistance to water and saline solutions. This and other objects and advantages of the present invention will be apparent to persons skilled in the art from the following description.

The powder coating composition of the present invention comprises (A) 100 parts by weight of powdery hydration reaction product of a copolymer comprising 60 to 95% by weight of ethylene and 5 to 40% by weight of a glycidyl acrylate compound wherein 5 to 80% by mole of epoxy group in the copolymer is hydrated, and (B) 0 to 100 parts by weight of powdery polyethylene, which are uniformly admixed.

The one component of the present invention, i.e. the hydration reaction product of ethylene-glycidyl acrylate compound copolymer, is obtained by subjecting 5 to 80% by mole, preferably 10 to 60% by mole, of epoxy group of the ethylene-glycidyl acrylate compound copolymer to hydration reaction with heating in a uniform or non-uniform system in the presence or absence of a catalyst.

One embodiment of the hydration reaction comprises subjecting the ethylene-glycidyl acrylate compound copolymer to hydration reaction in a three-component mixed solvent consisting of a good solvent, a poor solvent other than water, and water in the presence or absence of an alkali or acid catalyst at a temperature of higher than the melting point of the copolymer to give directly a powdery hydration reaction product.

The weight ratio of the good solvent and poor solvent in the solvent system is in the range of 1/10 to 10/1, preferably 1/5 to 5/1 (good solvent/poor solvent), and the weight ratio of the poor solvent and water is in the range of 1/50 to 50/1, preferably 1/10 to 10/1 (poor solvent/water). The three-component solvent is usually used in a weight ratio to the copolymer of 1/1 to 50/1, preferably 2/1 to 20/1 (the solvent/the copolymer).

The good solvent used in the present invention includes aromatic hydrocarbons (e.g. xylene, toluene, benzene), naphthalene hydrides (e.g. tetralin, decalin), halogenated hydrocarbons (e.g. carbon tetrachloride, perchloroethylene, chlorobenzene), phthalic acid esters (e.g. dioctyl phthalate, dimethyl phthalate), and a mixture of two or more thereof. Particularly suitable examples of the good solvent are aromatic hydrocarbons having 6 to 9 carbon atoms, such as xylene, toluene, or benzene, or a mixture thereof.

The poor solvent used in the present invention includes solvents which are soluble in the above good solvents and water, for example, lower fatty alcohols having 1 to 4 carbon atoms (e.g. methanol, ethanol, isopropanol), cellosolves, acetone, cyclohexane, or a mixture thereof. Particularly suitable examples of the poor solvent are lower fatty alcohols having 1 to 4 carbon atoms, such as methanol, ethanol, isopropanol, or a mixture thereof.

The hydration reaction of the present invention may be carried out in the presence of a catalyst, such as an alkali (e.g. sodium hydroxide, potassium hydroxide, ammonia, triethylamine), or an acid (e.g. sulfuric acid, phosphoric acid, hydrochloric acid, acetic acid). The system of mixture of the poor solvent and water is preferably regulated in the range of a pH of 11 to 3. When the pH range is outside the above range, it results in corrosion of reaction vessel and the reaction product must be washed, which is disadvantageous from the industrial viewpoint.

The hydration reaction is carried out at a temperature of higher than the melting point of the copolymer, e.g. usually at 90° to 150° C., for more than one hour, usually for 3 to 10 hours.

The hydration of the copolymer may also be carried out by melt-kneading the copolymer in the presence of water with an extruder or Banbury mixer, by which there is obtained the hydration reaction product in the form of a pellet or a film.

The starting ethylene-glycidyl acrylate compound copolymer can be produced by conventional methods, for example, by the method as disclosed in Japanese Patent Publication (unexamined) No. 23490/1972, wherein the polymerization is carried out under a pressure of 500 kg/cm$^2$ or higher, at a temperature of 40° to 200° C., e.g. under 1300 kg/cm$^2$, at 195° C. in the presence of a free radical-producing agent.

The glycidyl acrylate compound includes glycidyl methacrylate, glycidyl acrylate, or the like. The content of the glycidyl acrylate compound in the copolymer depends on the copolymerization methods and the applications of the hydration reaction product, but it is usually in the range of 5 to 40% by weight, preferably 10 to 30% by weight, and the content of ethylene is 60 to 95% by weight, preferably 70 to 90% by weight. The copolymer used in the present invention includes a copolymer of ethylene and glycidyl acrylate compound with 0 to 10% by weight, preferably 3 to 10% by weight, of other copolymerizable monomer, such as vinyl esters having 4 to 10 carbon atoms (e.g. vinyl acetate, vinyl propionate, vinyl butyrate, vinyl benzoate), esters of acrylic or methacrylic acid with an alcohol having 1 to 12 carbon atoms (e.g. methyl acrylate, ethyl acrylate, propyl acrylate, butyl acrylate, cyclohexyl acrylate, methyl methacrylate, ethyl methacrylate, propyl methacrylate, butyl methacrylate, cyclohexyl methacrylate). The copolymer used in the present invention usually has a melt index of 10 to 5,000 (measured by the method as disclosed in JIS K 6760-1971). The shape of the copolymer is not restricted, but copolymers having pelletized shape are usually used.

The hydration reaction product contains epoxy groups and hydroxy groups in the molecule and hence can be self-cured by heating and can strongly adhere to metals, glasses, polyolefins, or the like.

The other component, powdery polyethylene (B) can be produced by the conventional high-pressure, medium-pressure or low-pressure polymerization method and has a melt index of 0.5 to 100 and a density of 0.91 g/cc or larger. It may be a copolymer of ethylene with less than 30% by weight of other copolymerizable monomer such as vinyl acetate, methyl acrylate, methyl methacrylate, or the like.

The component (B) may be incorporated in the ratio of up to 100 parts by weight, preferably up to 50 parts by weight, per 100 parts by weight of the component (A). When the component (B) is used more than 100 parts by weight, the coating composition shows poor adhesion to metals and heat resistance. Within the above range of the component (B), the powder coating composition of the present invention shows excellent adhesion to metals with excellent water resistance and resistance to saline solutions even if no primer is used.

The components (A) and (B) are mixed by the conventional mixing methods, for instance, by dry-blending the powdery component (A) with the powdery component (B) with a Henschel mixer or tumbler, or melt-blending using an extruder or Banbury mixer, and then pulverizing the resulting blend by mechanical pulverization method (with pulverizer) or chemical pulverization method (with solvents).

The powder coating composition of the present invention may optionally be incorporated with an additive such as colorants, antioxidants, ultraviolet absorbers, or a filler such as resins (e.g. polypropylene, polybutene), or the like.

Suitable particle size of the present powder coating composition may depend on the kinds of coating methods, but in case of electrodeposition coating, smaller particle size is preferable, and in case of fluidization dip coating, larger particle size is preferable. The powder coating composition of the present invention has usually a particle size of 32 to 100 mesh pass (which means that the powder can pass 32 to 100 mesh).

The powder coating composition of the present invention can be applied to various substances, such as metals (e.g. iron, aluminum, zinc, tin, alloys of these metals), metals or glasses plated with the above metals, thermosetting resins (e.g. epoxy resin, urethane resin, epoxy-urethane resin, polyester resin), thermoplastic resins (e.g. polyethylene, polypropylene, polystyrene, nylone) in various shapes such as in the shape of pipe, bar, wire, plate, or the like. The materials to be coated should have a smooth surface and are preferably subjected to pre-treatment such as blast finishing or chemical treatment.

The substances coated with the powder coating composition of the present invention may optionally be coated with other compositions to form three or more coating layers. For instance, the products may have the structure having 3 to 4 layers, such as the base metal, a layer of a primer and a layer of the composition of the present invention; of the base metal, a layer of the composition of the present invention, a layer of polyethylene; or the base metal, a layer of a primer, a layer of the composition of the present invention, and a layer of polyethylene.

The present invention is illustrated by the following Examples but is not limited thereto.

In the Examples, various properties were measured in the following manner.

(1) Melt index:

It was measured under a load of 2160 g at 190° C. by the method as described in JIS K 6760-1971 and is shown by the amount of flowing out per 10 minutes (g/10 min).

(2) Content of glycidyl acrylate or methacrylate in the copolymer and hydration rate of epoxy group:

It was measured by back titration of epoxy group with hydroxylamine hydrochloride-sodium acetate.

(3) Peeling strength of coating layer obtained from powder coating composition:

In accordance with the method as described in JIS K 6766-1977, a coating layer prepared by coating a powder coating composition onto a metal was cut in a width of 10 mm and it was peeled at a rate of 100 mm/minute at a pulling angle of 180°, and thereby, the peeling strength was measured.

(4) Resistance to saline solution of coating layer:

One end of a coating layer was cut and dipped in 3% saline solution at 50° C. for 3 days, and thereafter, the length of peeling off was measured.

EXAMPLE 1

Ethylene-glycidyl methacrylate copolymer particles (content of glycidyl methacrylate: 19% by weight, melt index: 980, melting point: 84° C.) (4 kg) were charged into 30 liter autoclave, and thereto were added xylene (4 kg), methanol (12 kg) and water (4 kg). After purging with nitrogen gas, the mixture was subjected to hydration reaction with agitation at 130° C. for 5 hours. After cooling to room temperature, the resulting powdery hydration reaction product was separated from the reaction mixture with a centrifugal separator and then washed with methanol in an autoclave. After centrifuging again, the powdery hydration reaction product was dried at 50° C., 60 mmHg for 8 hours in a vacuum dryer.

The resulting powdery hydration reaction product (hereinafter, referred to as "hydration product A") showed a melt index of 220, and a hydration reaction rate of epoxy group of 48% by mole.

A steel plate (SSOO, thickness: 1 mm, length: 175 mm, width: 25 mm, which was polished with sand paper and defatted, and was previously heated in an electric furnace at 300° C. for 5 minutes) was immersed for 10 seconds in a fluidized bed of the hydration product A (48 mesh pass product), taken out, and then baked at 200° C. for 20 minutes in an electric furnace to give a smooth coating layer (thickness: 1 mm) having a peeling strength of 6.0 kg/10 mm and a peeling length in a saline solution of less than 1 mm.

EXAMPLE 2

The hydration product A as obtained in Example 1 (48 mesh pass product, 100 parts by weight) and a powdery polyethylene (melt index: 7, density: 0.920; 48 mesh pass product, 40 parts by weight) were dry-blended with Henschel mixer. The mixture was treated in the same manner as described in Example 1 to obtain a smooth coating layer (thickness: 0.9 mm) having a peeling strength of 4.5 kg/10 mm and a peeling length in a saline solution of 3.3 mm.

Reference Example 1

In the same manner as described in Example 1 except that powdery polyethylene (melt index: 7 and density: 0.92) was used instead of the hydration product A, there was obtained a smooth coating layer (thickness: 0.7 mm) having a peeling strength of 2.2 kg/10 mm. In the test of resistance to saline solution, the coating layer was wholly peeled off.

Reference Example 2

In the same manner as described in Example 1 except that a freeze-pulverized sample of ethylene-glycidyl methacrylate copolymer (content of glycidyl nethacrylate: 21% by weight, melt index: 53) was used instead of the hydration product A, there was obtained a smooth coating layer (thickness: 0.8 mm) having a peeling strength of 3.0 kg/10 mm and a peeling length in a saline solution of 10 mm.

EXAMPLE 3

In the same manner as described in Example 1 using as the starting material ethylene-glycidyl methacrylate-vinyl acetate copolymer (content of glycidyl methacrylate: 22% by weight, content of vinyl acetate: 0.2% by weight, melt index: 180), there was obtained powdery hydration reaction product having a hydration reaction rate of epoxy group of 53% by mole (hereinafter, referred to as "hydration product B").

A steel plate (SSOO, thickness: 1 mm, length: 175 mm, width: 25 mm, which was polished with sand paper and defatted, and was coated with an epoxy primer (SU Primer OS 3-184, made by Shinto Paint Co.) in a coating thickness of about 10μ and then was previously heated in an electric furnace at 220° C. for 20 minutes) was immersed for 10 seconds in a fluidized bed of the hydration product B (48 mesh pass product), taken out, and then baked at 180° C. for 30 minutes in an electric furnace to give a smooth coating layer (thickness: 1 mm) having a peeling strength of 5 kg/10 mm and a peeling length in a saline solution of 2 mm.

EXAMPLE 4

In the same manner as described in Example 3 except that a mixture of the hydration product B (48 mesh pass product, 100 parts by weight) and powdery polyethylene (melt index: 7, density: 0.920, 48 mesh pass product, 40 parts by weight) which were dry-blended with Henschel mixer was used instead of the hydration product B, there was obtained a smooth coating layer (thickness: 0.9 mm) having a peeling strength of 3.5 kg/10 mm and a peeling length in a saline solution of 4 mm.

Reference Example 3

In the same manner as described in Example 3 except that powdery polyethylene (melt index: 7, density: 0.92) was used instead of the hydration product B, there was obtained a smooth coating layer (thickness: 0.6 mm), but this product did not show adhesion to a steel plate (the peeling strength: 0 kg/10 mm.).

Reference Example 4

In the same manner as described in Example 3 except that a freeze-pulverized sample of ethylene-glycidyl methacrylate copolymer (content of glycidyl methacrylate: 21% by weight, melt index: 53) was used instead of the hydration product B, there was obtained a smooth coating layer (thickness: 0.8 mm) having a peeling strength of 2 kg/10 mm and a peeling length in a saline solution of 6 mm.

What is claimed is:

1. A powder coating composition comprising (A) 100 parts by weight of a powdery hydration reaction product of a copolymer comprising 60 to 95% by weight of ethylene and 5 to 40% by weight of a glycidyl acrylate compound wherein 5 to 80% by mole of the epoxy groups of the copolymer are hydrated to produce 1,2-dihydroxy groups, and (B) up to 100 parts by weight of powdery polyethylene.

2. A powder coating composition according to claim 1, which comprises 100 parts by weight of the powdery hydration reaction product (A) and up to 50 parts by weight of the powdery polyethylene (B).

3. A powder coating composition according to claim 1, wherein the powdery hydration reaction product is obtained by subjecting an ethylene-glycidyl acrylate compound copolymer to hydration reaction in a three-component solvent consisting of a good solvent, a poor solvent other than water, and water at a temperature of higher than the melting point of the copolymer.

4. A powdery coating composition according to claim 3, wherein the good solvent is a member selected from an aromatic hydrocarbon having 6 to 9 carbon atoms and a mixture of two or more thereof, and the poor solvent is a member selected from a lower fatty alcohol having 1 to 4 carbon atoms and a mixture of two or more thereof.

5. A powdery coating composition according to claim 1, wherein the copolymer is a two- or three-component copolymer consisting of 60 to 95% by weight of ethylene, 5 to 40% by weight of glycidyl acrylate or methacrylate, and 0 to 10% by weight of one or more copolymerizable monomer selected from the group consisting of a vinyl ester having 4 to 10 carbon atoms and an ester of acrylic or methacrylic acid with an alcohol having 1 to 12 carbon atoms.

* * * * *